Aug. 31, 1943.　　　　J. H. LAWS　　　　2,328,349
VALVE
Filed Dec. 18, 1942
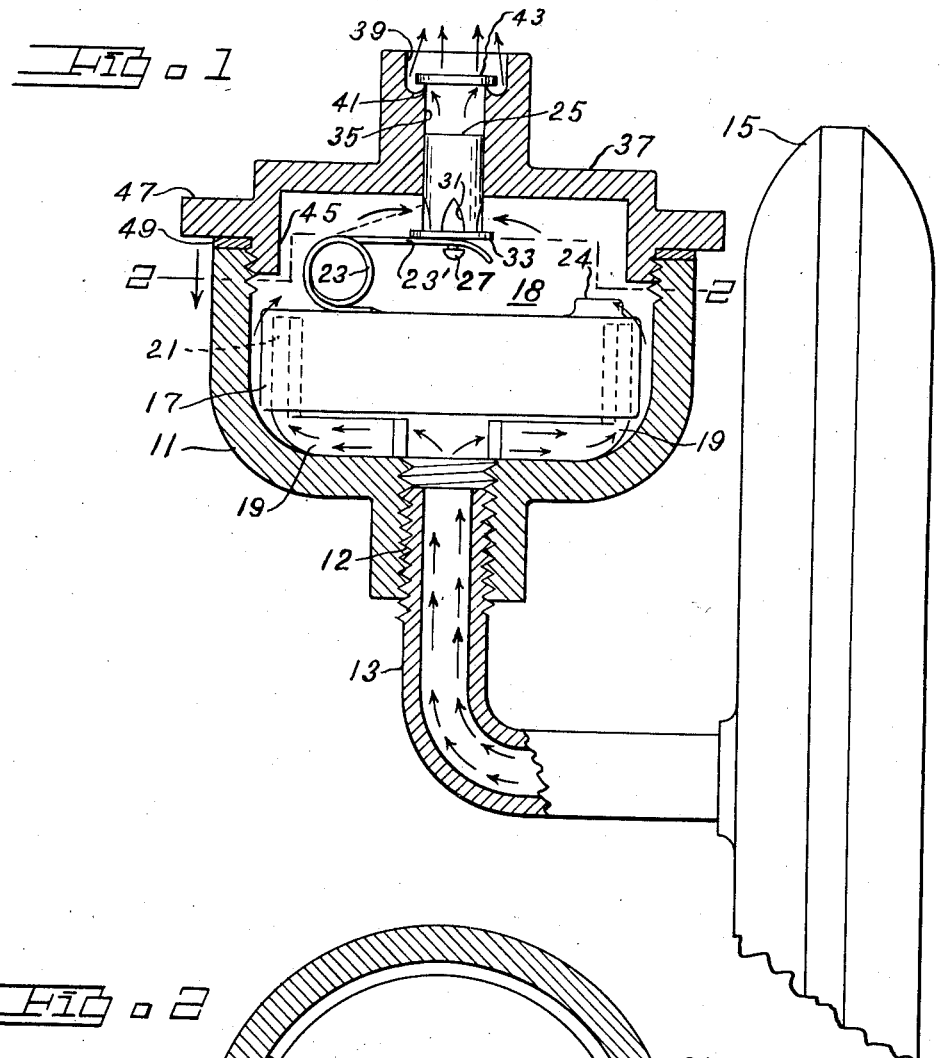
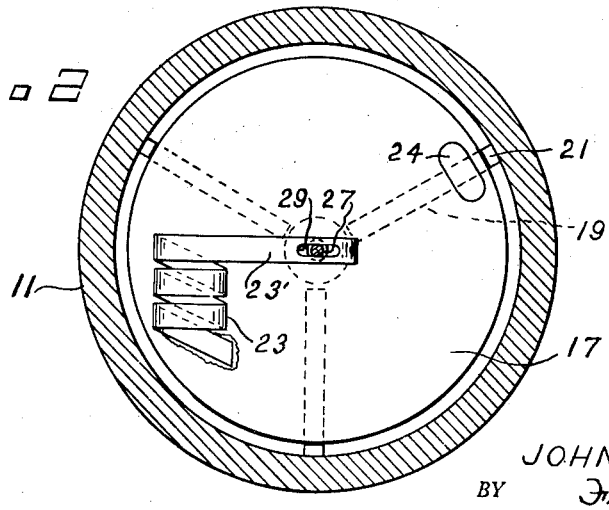
INVENTOR.
JOHN H. LAWS
BY
HIS ATTORNEY Patented Aug. 31, 1943

2,328,349

UNITED STATES PATENT OFFICE 2,328,349

VALVE

John H. Laws, Detroit, Mich.

Application December 18, 1942, Serial No. 469,385

4 Claims. (Cl. 236—62)

My invention pertains to valves and more particularly to an outlet relief valve for steam heating systems, and this is a continuation in part of my patent application Serial No. 428,055 filed January 24, 1942, for Valves.

In steam heating systems of the type comprising a boiler or steam generator supplying steam to a number of radiators, an outlet relief valve is usually provided on the end of each radiator remote from the steam inlet for the purpose of bleeding the cold air out of the radiator into the room in order to permit the hot steam to enter the radiator. The steam from the boiler must pass through varying lengths of pipe and it is found that the nearest radiators receive steam and deliver heat much more quickly than the more remote radiators. It is especially true that the most remote radiator or radiators of such a system may be very slow to heat up because after the first steam enters the closest radiators, the returning condensate tends to cool the water in the boiler so that sufficient steam for the remote radiators is not received for a much longer time. The usual relief valves having inadequate outlet discharge capacity tend to aggravate this difficulty.

It is accordingly an object of my invention to provide an improved outlet relief valve for steam heating systems providing a large discharge capacity in a simple rugged construction which is reliable and positive acting in operation.

It is also an object of my invention to provide such an improved outlet relief valve having increased discharge capacity and comprising the combination of valve means controlled by a float and a thermally responsive member mounted as a unit with the float and connected for controlling the valve means to open the valve at low temperatures, to close the valve at high temperatures, or to close the valve when condensate is received at any temperature.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of my invention, similar reference characters being applied to corresponding elements throughout, and in which:

Fig. 1 is a side elevational view showing an installation of my improved relief outlet valve on a radiator, and partially broken away and sectioned to show the internal construction; and Fig. 2 is a cross sectional view on line 2—2 in Fig. 1.

Referring more specifically to the drawing, my improved master relief outlet valve comprises a valve housing 11, which may be a bowl shape of circular cross section, with a threaded aperture 12 opening through the bottom for receiving a pipe 13 whereby the device may be mounted upon and connected to a radiator 15 of a steam heating system, in a well known manner. A float 17, which is provided in the chamber 18 enclosed by the housing, is of a shape and size suitable for free movement therein. The float 17 may be any member buoyant in water made of wood, cork or a sheet metal inverted bell or sealed vessel, in accordance with the usual practice in floats for actuating valves.

The float 17 normally sits on rests 19 rising from the bottom of the chamber so that the aperture in the bottom is unobstructed and fluid may at all times flow freely therethrough, as indicated by the arrows. Three or more rests 19 are provided, and these may extend radially, as shown in Fig. 2. Projecting from the outer ends of the rests are guides 21 provided rising axially along the side walls of the valve housing 11 at circumferentially spaced positions for accurately guiding the movements of the float 17 as it rises or as it descends to rest and for maintaining a free space through which fluid may flow freely around the float. A thermally responsive control element 23, is mounted on top of the float 17. For this purpose I preferably utilize a coiled bimetallic strip made of two strips of corrosion resistant metals.

One end of the thermally responsive member 23 is secured to the top of the float 17, as by welding or brazing when the float is of sheet metal or by means of screws or other suitable fasteners when the float is of wood or cork. This also prevents movement of this end when the coiled member responds to temperature changes.

This coiled bi-metallic thermal element is provided with a substantial number of coiled turns and it is mounted on the float toward one side thereof. The other or free moving end of the coiled thermal element is extended toward and over the center of the float for providing a movement multiplying lever arm 23'. A counterweight is provided on the float at a position opposite from the side whereon the thermal element is mounted in order to balance the float 17 and cause it to move freely in the chamber. The counter-weight 24 may be a body of solder or any other body which can be conveniently applied on the float in suitable quantity and position to balance the float. The end of the movement multiplying arm extending from the free moving end of the coiled thermal element is secured to a valve 25 to be controlled, and this connection is made by means of a pin 27 passing through a slot 29 in the extended arm end of the bi-metal strip, as shown. By using a conveniently removable screw pin 27 the valve 25 may be disconnected conveniently for grinding and reseating. The end of arm 23' on bi-metal strip 23 is curled down slightly in such a shape as to maintain free sliding engagement under the center of the valve 25 as the strip straightens out and lifts the valve.

The valve 25 which is raised or lowered by the action of either the float 17 or the thermally responsive element 23, or both, is a tubular or hollow cylindrical member open at the upper end and having ports 31 opening through the side wall near the lower end. The lower end of the valve cylinder 25 is closed by a disc or cap 33 wherein the screw 27 is firmly secured for attaching the valve to the arm end of the thermally responsive element 23.

The tubular valve member 25 slides freely into an aperture 35 passing up through a cover or cap 37 comprising the upper portion of the valve housing. The valve cap 33 is larger in diameter than the valve providing a laterally projecting flange or rim for seating against the under side of the cover 37. When the valve is lifted to the uppermost position, the rim engages the underside of the cover portion of the valve housing, and the side ports 31 in the valve are then closed.

The upper end of the valve aperture 35 is provided with a counter-bore 39 of enlarged diameter forming a shoulder 41 providing a check valve seat which may be accurately ground for receiving a snug sealing check valve disc 43 of light sheet metal, or of a light plastic or fiber composition, to prevent the reverse flow of air into the valve housing and into the radiator.

The cover portion 37 of the valve housing is snugly secured and sealed upon the lower portion by means of an externally threaded annular flange 45 of a suitable diameter projecting down from the lower side and screwing into an internal thread in the upper end of the main valve housing 11. The cover 37 is also provided with a laterally projecting flange 47 adapted to receive a wrench to be screwed down for snugly engaging the upper end surfaces of the valve housing. If desired, an annular gasket 49 of any suitable yieldable sheet packing material may be clamped between the engaging surfaces to facilitate making a tight sealed connection therebetween.

In operation the float 17 normally sits upon the rests spaced from the side walls of the housing in a predetermined position as determined by the rests 19 and the guides 21. The valve is free to move down and open the valve ports 31 while low temperatures prevail, and cold air is then rapidly discharged from the radiator 15 through the pipe 13 and thence through the ample discharge passages provided, as indicated by the arrows. When the cold air has been discharged and the radiator 15 is filled with hot steam, the steam then passes through the pipe 13 into the outlet relief valve, and the upper end of the thermally responsive element 23 then tends to uncurl or straighten. The movement is greatly multiplied by the extended lever arm 23' and the number of coiled turns provided. The movable arm 23' of the coiled thermal element engages the center of the bottom of the valve 25 and freely lifts the valve until the rim of the valve disc 33 engages the under surface of the cover 37. The valve ports 31 are then closed and the discharge of hot steam from the radiator 15 into the room atmosphere is restricted. When the temperature of the valve housing 11 drops, the thermally responsive element contracts or curls and the valve 25 is again opened for discharging to atmosphere until the radiator is again fully charged with hot steam. This cycle of operation repeats, accurately keeping the radiator hot and providing ample heat. The attachment of one end of the coiled member 23 to the float serves both to mount it upon the top of the float and also serves to prevent movement of the anchored end when the device responds to temperature changes.

If the radiator should be partially closed off it might collect full of condensed water which would then pass into the valve housing. When this occurs the float 17 rises and the arm end of the heat responsive member 23 lifts the valve and closes the valve ports irrespective of the temperature. The water drains back from the radiator 15 into the heating system, and from the valve housing 11 into the radiator, and the float 17 is then lowered to sit down upon the rests 19 drawing the valve down to wide open position and the discharge passages of the outlet valve are again opened providing ample discharge capacity for quickly bleeding the radiator of air until it is fully charged with hot steam.

The check valve 43 effectively prevents the reverse flow of air from the room into the radiator 15 and being a very light member it creates only a very slight back pressure while cold air is flowing from the radiator out to atmosphere. My outlet relief valve is especially desirable for use on the radiators which are the most remote from the steam boiler, and it may be desirable at times to remove the check valve disc 43 to entirely eliminate the slight back pressure necessary to hold the check valve disc open.

When it is desired to disassemble the outlet relief valve, it is only necessary to unscrew the cover from the valve housing when the float and thermally responsive valve assemblage may be conveniently lifted out for replacement or repair. Any part may be conveniently replaced or renewed. By removing the pin and detaching the valve from the thermally responsive member, the valve may be conveniently ground and the valve and seat surfaces renewed.

It is apparent that within the scope of the invention, modifications and different arrangements may be made other than herein disclosed, and the present disclosure is illustrative merely, the invention comprehending variations thereof.

I claim:

1. In combination in an outlet relief valve for steam heating systems, an open top casing enclosing a float chamber, a float in said chamber, an aperture opening through the bottom of said float chamber, rests for supporting said float spaced from the bottom of said chamber so that said aperture is open at all times, a cover secured in firm sealed engagement upon and closing the upper edge of said open top casing, an atmosphere vent opening through said cover, a valve member slidable in said vent for opening or closing the vent, a coiled bi-metallic thermally exposed member exposed to temperatures in said float chamber, said bi-metallic member having one end secured to the top side of said float in an off-center position, and the other end of said coiled bi-metallic member being extended over the center of the float to provide a movement multiplying lever arm, said arm being connected to said valve member by a pin and slot connection for closing said atmosphere vent in response to high temperature and for opening the vent in response to low temperature except when condensate enters said chamber and raises the float which closes the atmosphere vent.

2. An outlet relief valve for steam heating systems comprising a housing enclosing a float chamber, a float in said chamber, an aperture opening from said chamber through the bottom of said housing, float rests on the bottom of said housing and spaced for supporting said float above the bottom of the housing, a vent in the upper portion of said housing, valve means for controlling said vent, a coiled bi-metallic member mounted in an off-center position upon the top side of the float with one end attached thereto, the other end of said coiled member extending toward and over the center of the float to provide a movement multiplying lever arm, the extended end of the coiled member having an aperture, and a pin passing through said aperture and connecting to said valve means for closing the valve means with a relatively free movement therewith in response to rising temperatures and said coiled member serving also as a connection for operating the valve means when the float is lifted by condensate in said chamber.

3. The combination in an outlet relief valve for steam heating systems in accordance with claim 1, and further characterized by said atmosphere vent being of a circular cross-section large enough to provide ample discharge, said valve member being of tubular conformation sliding freely into the inner end of said vent, the inner end of the valve member being closed and having a laterally projecting rim or flange for seating against the inside surface of said cover, discharge ports opening through the sidewalls of said tubular valve member for discharging air from the casing at a rapid rate when the valve is opened.

4. An outlet relief valve for steam heating systems in accordance with claim 2, and further characterized by said vent being circular in cross-section and large enough to provide ample discharge capacity, said valve means being a tubular member slidable freely into the inner end of said vent, the inner end of the tubular valve member being closed and having a laterally projecting rim or flange for seating against the inner surface of the housing, discharge ports opening through the sidewalls of the tubular valve member for discharging air at a rapid rate when the valve is opened.

JOHN H. LAWS.